Figure 1:
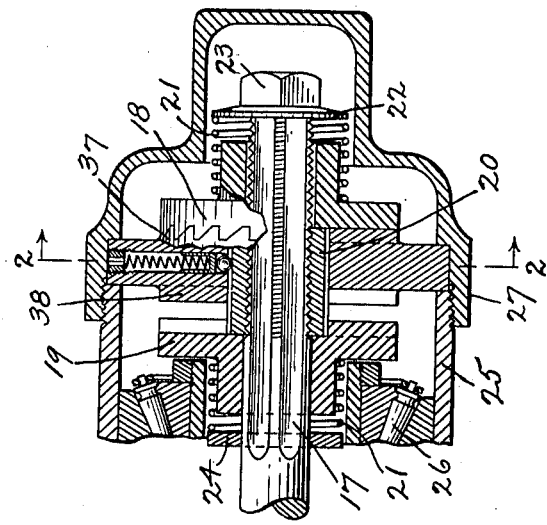
Figure 1:
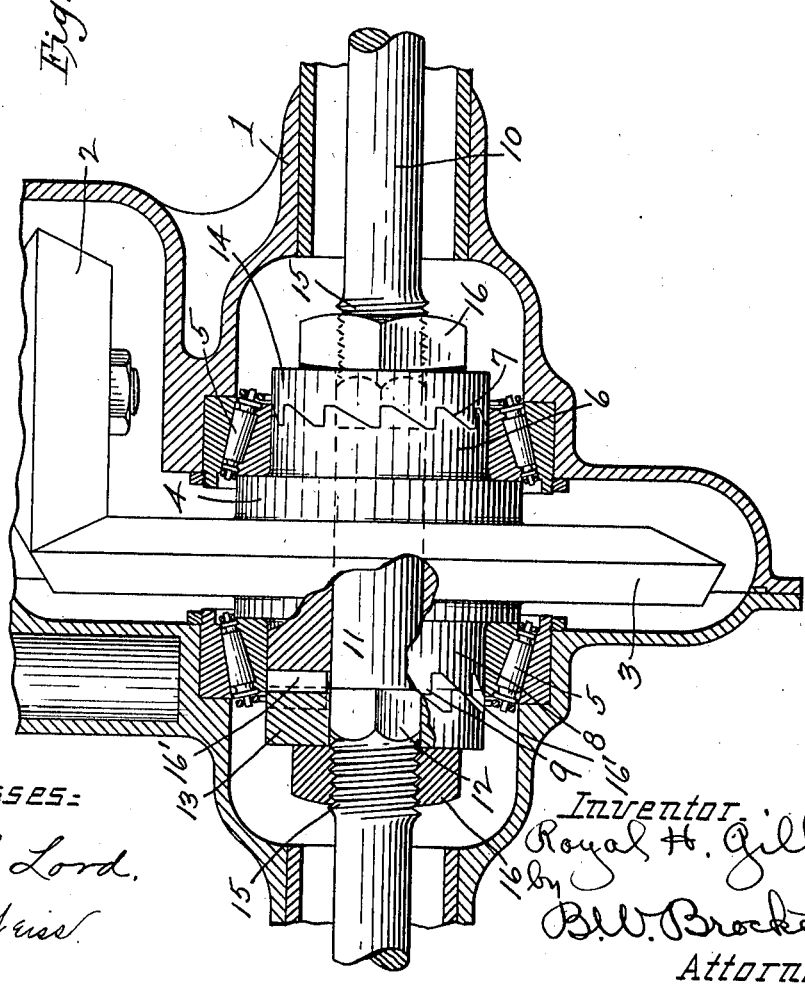

R. H. GILBERT.
DRIVING AXLE.
APPLICATION FILED APR. 8, 1907.

949,179.

Patented Feb. 15, 1910.
2 SHEETS—SHEET 1.

Witnesses:
A. L. Lord.
R. Weiss.

Inventor,
Royal H. Gilbert,
by B.W. Brockett.
Attorney.

R. H. GILBERT.
DRIVING AXLE.
APPLICATION FILED APR. 8, 1907.

949,179.

Patented Feb. 15, 1910.
2 SHEETS—SHEET 2.

Witnesses:
A. L. Lord.
R. Heiss

Inventor.
Royal H. Gilbert.
by B. W. Brockett.
Attorney.

UNITED STATES PATENT OFFICE.

ROYAL H. GILBERT, OF LAKEWOOD, OHIO.

DRIVING-AXLE.

949,179.

Specification of Letters Patent. Patented Feb. 15, 1910.

Application filed April 8, 1907. Serial No. 366,957.

*To all whom it may concern:*

Be it known that I, ROYAL H. GILBERT, residing at Lakewood, in the county of Cuyahoga and State of Ohio, have invented a certain new and useful Improvement in Driving-Axles, of which the following is a full, clear, and exact description, reference being had to the accompanying drawings.

This invention relates to improvements in rear axle construction for motor vehicles and the like and is especially designed as an improvement over the construction set forth in my co-pending application filed February 19, 1907, Serial No. 358,229, wherein the rear axle is made solid, is adapted to be driven by a suitable gear, preferably at the center, and is arranged in a manner such that the rotation of the driving gear in either direction causes a slight shifting of the axle longitudinally and thereby couples the driving wheels to the former in a manner to be driven with it irrespective of its direction of rotation. The shifting mechanism between the driving gear and the rear axle in this construction is in the form of a thread or screw upon the axle and coöperating with a nut member carried by the driving gear which is held against any except a rotary motion, thus bringing about the shifting described.

The present invention relates to an improvement in the axle shifting mechanism over the construction set forth in the above mentioned application.

It also relates to mechanism for creating a drag as it were upon the axle bringing about the complete shifting of the rear axle as will more fully appear.

More specifically the invention contemplates the use of a driving member mounted in suitable bearings in the casing of the rear axle in a manner such that it is held against any except rotary movement and is provided with a suitable hub having upon the side faces thereof cam teeth which are adapted to mesh with and engage corresponding cam teeth carried by the rear axle, which is arranged in a manner such that it may be shifted endwise and has upon each end thereof clutch members operating with clutch members carried by the driving wheels whereby upon the shifting of the axle longitudinally, the clutch members are coupled to the wheels to drive the same in one direction or the other as the case may be. The cam members between the driving member and the axle are such that upon the operation of the driving member in a forward direction the rear axle will be shifted in a manner to couple the forward clutch members thereon to the forward clutch members carried by the wheel and upon a change in the direction of rotation of the driving member or upon the reverse rotation thereof the cam members and their teeth will cause the rear axle to be shifted in the opposite direction thus bringing about the coupling of the reverse clutch members upon the axle with the reverse clutch members carried by the driving wheel. Upon a change in the direction of rotation of the driving member it is necessary to bring some drag or friction to bear upon the rear axle to cause the cam faces of the cam teeth to shift the same completely from one side to the other, as the case may be, in order to obviate the shifting of the rear axle longitudinally only to an amount which is just sufficient to release the clutch members already in engagement and yet not enough to cause a shifting which will bring about the coupling of the other clutch members. It forms a part of this invention therefore to arrange between the wheels and the axle a suitable device which tends to hold or retard the rotation thereof so that when the driving gear is rotated in a direction, which is the reverse of that in which it has already been rotating and the cam teeth carried thereby are acting against the cam teeth carried by the rear axle, the retarding device will cause such camming operation to continue until the coupling members at the ends of the rear axle are shifted so that the wheels may be driven with the axle.

The invention may be further briefly summarized as consisting in the construction and combination of parts hereinafter set forth in the following description, drawings and claims.

Figure 2:
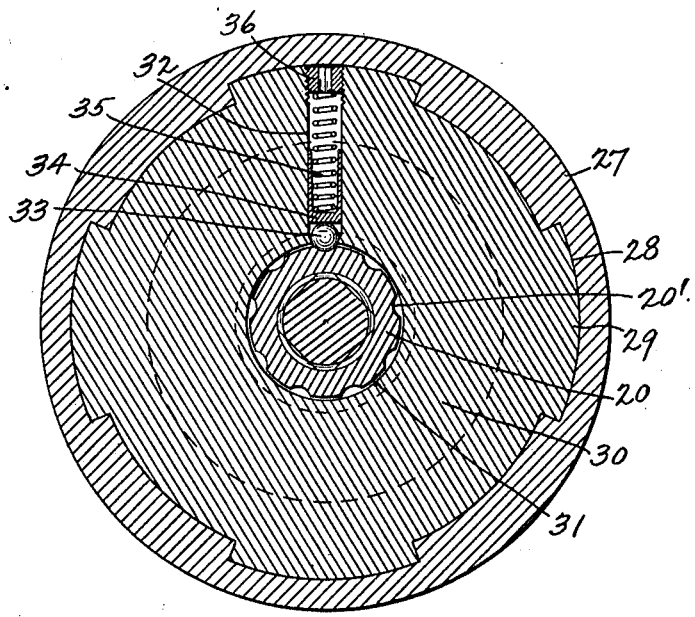
Figure 3:
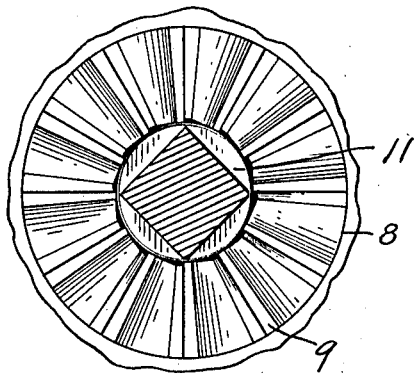

Referring to the drawings Figure 1 is a top plan view partly in section, showing my device, Fig. 2 is a section upon the line 2—2 of Fig. 1, and Fig. 3 is a face view in elevation showing the camming teeth.

Any preferred form and construction of device may be employed in the carrying out of my invention but I have shown one form, which meets the requirements very effectively and in such embodiment 1 represents the casing adapted to receive the driving pinion 2 mounted in suitable bearings, not shown, and adapted to mesh with a driving gear 3, which is provided with a hub carried by suitable roller bearings 5 and thereby held against any except rotary movement.

The hub 4 is provided with a cam member 6 having upon the face thereof teeth 7 and with another cam member 8 on the opposite side and having teeth 9 upon the face thereof arranged reversely with respect to the teeth 7 of the other cam member. The hub 4 is further provided with an opening extending through the same and continued through the cam members 6 and 8, for the purpose of receiving loosely the rear axle 10 which preferably extends in a solid structure from one wheel to the other. The shaft 10 has an enlarged portion 11 fitting loosely in the opening of the driving gear and the cam members 6 and 8 and a squared part 12 at either end thereof adapted to take into a squared opening in the clutch members 13 and 14. The shaft 10 is further provided with a threaded portion 15 adjacent to the enlarged portion 11 for the purpose of receiving nuts 16 engaging the cam members 13 and 14 and forcing them against the shoulders formed at the ends of the enlarged portion 11. The cam portions 13 and 14 are provided upon their faces with teeth 16' corresponding to and coöperating with the teeth carried by the cam members of the driving gear and they are spaced apart sufficiently so that when the set of teeth of one of the cam members, carried by the driving gear is in engagement with one of them, the teeth on the other cam member of the driving gear are barely within the face of the other cam member carried by the axle as shown in Fig. 1. It will be seen from this construction that when the driving gear is rotated in one direction the inclined faces of the teeth of one pair of camming members will shift the axle in one direction longitudinally, for example, as shown in Fig. 1 when the driving gear is turned over toward the top, the teeth of the cam members on the left hand side of the gear have shifted the rear axle of the left longitudinally. This shifting of the rear axle brings about the interlocking of the teeth of the other pair of camming members or the right hand pair as shown in Fig. 1, under the conditions stated, which happen to be those which prevail when the axle is driven in forward direction. This shifting of the rear axle longitudinally brings about the opening of the forward and reverse wheel clutch members which is described and set forth in my copending application referred to, but they will now be described further for the sake of clearness.

The rear axle 10 is provided with squared end portions 17 adapted to receive the forward clutch members 18 and reverse clutch members 19, all of which are squared onto such squared portions 17 but are free to slide thereon. These clutch members take against the stop sleeve 20 which is threaded onto the rounded portions between the squared end faces of the portions 17 of the axle and has longitudinal recesses on the periphery thereof. Springs 21 are adapted to take against the clutch members 18 and 19 to force them toward the stop sleeve 20 and the outer clutch member on each end of the shaft has its spring 21 mounted between it and a washer 22 secured by cap screw 23 to the end of the axle. The inner clutch members have their springs supported or backed up at the ends by means of washers 24 provided with squared openings, which take upon the squared end portions of the axle and abut against the rounded portions of the axle where the flat sides or faces 17 taper off.

The hubs 25 of the rear wheels are mounted on suitable rolling bearings 26 carried by the casing 1 and they are provided with caps 27 having recesses 28 which receive the tongues 29 of the wheel clutch members 30. Each of the wheel clutch members 30 extends down between the clutch members 18 and 19 and is provided with an opening 31 which fits loosely upon the stop sleeve 20 as shown in Fig. 2, and with a radial opening 32 extending from the inner to the outer periphery for the purpose of receiving the retarding device already referred to. The retarding device consists of a ball 33 mounted in said opening 32 and it is engaged by a plunger 34 backed up by a spring 35 held in place by a plug 36 screwed into the opening 32. This ball 33 engages in the longitudinal recesses 20' in the periphery of the stop sleeve 20 for a purpose to be described. Each clutch member 30 is further provided upon one side face with forward clutch teeth 37 and on the other with reverse clutch teeth 38 for engaging with the forward and reversed clutch members on the corresponding ends of the axle.

It will be seen from the description of the mechanism about each end of the axle that when the rear axle is shifted longitudinally in the manner described and one of the clutch members is just moving out of engagement with the clutch member corresponding to it on account of a change in direction of rotation as previously set forth, the ball 33 engages in the longitudinal recesses on the periphery of the stop sleeve and causes the camming operation, which takes place at the driving gear, to continue after such clutch members are completely in engagement, thus preventing the driving gear from camming the clutch members out of engagement and permitting them to run free without being cammed sufficiently to bring them into engagement with the other clutch members.

In going around turns this device operates in a manner similar to that set forth in my co-pending application and the high speed wheel, or the one on the outside of the turn is permitted to rotate independently by the clutch member on that side of the vehicle, and in engagement at that time, snapping over the teeth of its corresponding clutch member.

A distinctive feature of this invention is the fact that the device operates automatically in a manner such that when the car is to be stopped or when the speed is to be broken in any way it may be readily accomplished by throttling the engine. This feature is brought about by reason of the fact that when the driving wheels are traveling faster than the rear axle the clutch members which are then in engagement in the hubs of the wheels will tend to shift the axle longitudinally until the teeth are out of engagement when the retarding device or friction device will tend to rotate the axle at the same speed at which the wheels are traveling and this will cause the complete shifting of the axle longitudinally in the same direction and the coupling of the opposite clutch members of the wheels. This, in a sense, causes the wheels to tend to drive the engines which may be throttled thus bringing about the operation just referred to.

Having described my invention, I claim:

1. In a motor vehicle, in combination, a driving member, driving wheels, an axle coöperating with said wheels, forward and reverse coupling devices between said axle and each of the driving wheels whereby the latter may be driven by the former in either direction, and a plurality of cams between said driving member and said axle for bringing about the coupling of the latter to the wheels.

2. In a motor vehicle, in combination, a driving member, driving wheels, an axle for driving said wheels, forward and reverse coupling devices between said axle and each of the driving wheels whereby the latter may be driven by the former in either direction, and a plurality of cam teeth between said driving member and said axle for causing the longitudinal shifting of the latter to couple the wheels thereto.

3. In a motor vehicle, in combination, driving wheels, a driving member, adapted to be held against any except rotary movement, an axle, for driving said wheels, forward and reverse coupling devices between the two whereby upon the shifting of said axle longitudinally said wheels are coupled thereto in a manner to be driven by the same, cam teeth carried by said driving member, and cam teeth carried by said axle and adapted to engage the cam teeth of said driving member, said sets of cam teeth being arranged in a manner such that the rotation of said driving member will cause the shifting of the axle longitudinally and thereby cause the coupling of the wheels to the same to be driven thereby.

4. In a motor vehicle, in combination, driving wheels, an axle for said wheels, a driving member, forward and reverse coupling devices upon said axle for each wheel, cams carried by said driving member, and cam members rigidly secured to said axle and arranged to coöperate with the cams of the driving member in a manner such that a change in the direction of rotation of the latter causes a slight longitudinal shifting of the former and brings about the coupling of the coupling devices of the wheels to cause them to rotate with the axle.

5. In a motor vehicle, in combination, driving wheels, an axle for said wheels, a driving member, forward and reverse coupling devices upon said axle for each wheel, cams upon each side of said driving member and adapted to rotate therewith, and cam members carried by said axle and coöperating with the cams of said driving member, said cam members being arranged in a manner such that upon a change in rotation of the driving member the rear axle is shifted longitudinally in one direction or the other.

6. In a motor vehicle, in combination, driving wheels, an axle for said wheels, and adapted to be shifted longitudinally, forward and reverse coupling devices between said axle and each of the wheels and adapted to be brought into engagement by the longitudinal movement of said axle, a driving member held against any except rotary movements, cam teeth on each side of said driving member, the teeth of one set extending in a reverse direction to those of the other set, cam members rigidly secured to said axle, and cam teeth carried by said cam members and arranged to coöperate with the cam teeth on the sides of the driving member, said cam members with their teeth being spaced sufficiently apart so that when one member is in engagement the other is out whereby a change in rotation of the driving member causes a longitudinal shifting of said axle.

7. In a motor vehicle, in combination, driving wheels, a driving member, an axle for driving said wheels, forward and reverse clutch devices between said axle and each wheel and adapted to be brought into engagement respectively by the longitudinal movement of the axle, means between said driving member and said axle for causing the longitudinal shifting of the latter upon a change in rotation of the former, and means for creating a drag or friction upon said axle, and thereby causing the complete shifting of the same longitudinally upon a change in rotation of the driving member.

8. In a motor vehicle, in combination, driving wheels, a driving member, an axle for driving said wheels, forward and reverse clutch devices between said axle and each wheel and adapted to be brought into engagement respectively by the longitudinal movement of the axle, means between said driving member and said axle for causing the longitudinal shifting of the latter upon a change in rotation of the former, and a yielding device for creating a drag or friction upon said axle to cause said shifting means to move said axle to an extent sufficient to bring about the coupling of the clutch members at the end of the axle.

9. In a motor vehicle, in combination, driving wheels a driving member, an axle for driving said wheels, forward and reverse clutch devices between said axle and each wheel and adapted to be brought into engagement respectively by the longitudinal movement of the axle, means between said driving member and said axle for causing the longitudinal shifting of the latter upon a change in rotation of the former, and a yielding device engaging said axle and creating a drag or friction upon the same and thereby causing the complete movement thereof longitudinally by said shifting means upon a change in rotation of the driving member.

10. In a motor vehicle, in combination, driving wheels a driving member, an axle for driving said wheels, forward and reverse clutch devices between said axle and each wheel and adapted to be brought into engagement respectively by the longitudinal movement of the axle, means between said driving member and said axle for causing the longitudinal shifting of the latter upon a change in rotation of the former, a sleeve mounted upon said axle and provided with recesses, and a yielding device adapted to engage said sleeve and its recesses and thereby creating a drag or friction upon the axle and causing a complete movement of the same longitudinally by said shifting means upon a change in rotation of the driving member.

11. In a motor vehicle, in combination, driving wheels, a driving member, an axle for driving said wheels, forward and reverse clutch devices between said axle and each wheel and adapted to be brought into engagement respectively by the longitudinal movement of the axle, means between said driving member and said axle for causing the longitudinal shifting of the latter upon a change in rotation of the former, a sleeve secured to said axle and provided with longitudinal recesses in its periphery, and a spring actuated device bearing against said periphery and engaging in said recesses for creating a drag or a retarding influence upon said axle and causing the complete movement longitudinally of the same by the shifting means.

12. In a motor vehicle, in combination, driving wheels, a driving member, an axle for driving said wheels, forward and reverse clutch devices between said axle and each wheel and adapted to be brought into engagement respectively by the longitudinal movement of the axle, means between said driving member and said axle for causing the longitudinal shifting of the latter upon a change in rotation of the former, and means carried by the wheel for creating a drag or friction upon said axle and thereby causing the complete movement of the same longitudinally by said axle shifting means.

13. In a motor vehicle, in combination, driving wheels, a driving member, an axle for driving said wheels, forward and reverse clutch devices between said axle and each wheel and adapted to be brought into engagement respectively by the longitudinal movement of the axle, means between said driving member and said axle for causing the longitudinal shifting of the latter upon a change in rotation of the former, and a yielding device carried by each wheel for creating a drag or friction upon said axle and thereby causing the complete movement of the same longitudinally by said axle shifting means.

14. In a motor vehicle, in combination, driving wheels, a driving member, an axle for driving said wheels, forward and reverse clutch devices between said axle and each wheel and adapted to be brought into engagement respectively by the longitudinal movement of the axle, means between said driving member and said axle for causing the longitudinal shifting of the latter upon a change in rotation of the former, a sleeve carried by said axle and provided with recesses, and a yielding device carried by each wheel for engaging in said recesses and exerting a retarding influence upon said axle to bring about the complete longitudinal movement thereof by said shifting means.

15. In a motor vehicle, in combination, driving wheels, a driving member, an axle for driving said wheels, means between said driving member and said axle for causing the longitudinal shifting of the latter upon a change in rotation of the former, a forward and reverse clutch member upon each end of said axle and adapted to be shifted into operation respectively by the longitudinal movement of the axle, a clutch member carried by each wheel for engagement with the forward and reverse clutch members at the corresponding end of the axle, and a yielding device upon the clutch member of one wheel for causing a retarding of the axle and bringing about a complete movement of the same longitudinally by said shifting means.

16. In a motor vehicle, in combination, driving wheels, a driving member, an axle for driving said wheels, means between said driving member and said axle for causing the longitudinal shifting of the latter upon a change in rotation of the former, a forward and reverse clutch member upon each end of said axle and adapted to be shifted into operation respectively by the longitudinal movement of the axle, a clutch member carried by each wheel for engagement with the forward and reverse clutch members at the corresponding end of the axle, a sleeve upon said axle and provided with recesses in its periphery, and a yielding device carried by one of the wheels and adapted to engage in said recesses and retard the movement of the axle sufficiently to bring about the complete longitudinal movement thereof by the axle shifting means.

17. In a motor vehicle, in combination, driving wheels, a driving member, an axle for driving said wheels, means between said driving member and said axle for causing the longitudinal shifting of the latter upon a change in rotation of the former, a forward and reverse clutch member upon each end of said axle and adapted to be shifted into operation respectively by the longitudinal movement of the axle, a clutch member carried by each wheel for engagement with the forward and reverse clutch members at the corresponding end of the axle, a stop sleeve secured to said axle between the forward and reverse clutch members at both ends of the shaft and having longitudinal recesses in its periphery, and a spring actuated device carried by the clutch member of each wheel for engaging in the longitudinal recesses of the corresponding stop sleeve and causing a retarding of the axle sufficient to bring about the complete movement of the same longitudinally by the shifting means.

In testimony whereof I affix my signature in the presence of two witnesses.

ROYAL H. GILBERT.

Witnesses:
  R. WEISS,
  B. W. BROCKETT.